United States Patent [19]

Farr

[11] 4,032,200
[45] June 28, 1977

[54] ANTI-SKID HYDRAULIC BRAKING SYSTEMS FOR VEHICLES

[75] Inventor: Glyn Phillip Reginald Farr, Leek Wootton, England

[73] Assignee: Girling Limited, Birmingham, England

[22] Filed: May 4, 1976

[21] Appl. No.: 682,980

[30] Foreign Application Priority Data
May 10, 1975 United Kingdom ............ 19742/75

[52] U.S. Cl. .............................. 303/116; 188/344
[51] Int. Cl.² ......................................... B60T 8/087
[58] Field of Search ......... 188/344, 181 A; 303/10, 303/11, 61, 114, 116, 117

[56] References Cited
UNITED STATES PATENTS
3,743,363  7/1973  Hodge et al. ..................... 303/116

Primary Examiner—Duane A. Reger
Attorney, Agent, or Firm—Scrivener, Parker, Scrivener & Clarke

[57] ABSTRACT

In an anti-skid hydraulic braking system for a vehicle a master cylinder supplying fluid under pressure to apply a brake includes an operating piston and a boost piston both working in a common bore with a boost chamber defined in the bore between adjacent ends of the piston. A boost control valve is provided between the pistons and is movable between a normally open inoperative position in which the boost chamber is in communication with return and outlet ports in the cylinder and an operative closed position when the master cylinder is operated in which the boost chamber is isolated from the return and outlet ports so that pressure in the boost chamber is increased to advance the boost piston in the bore to pressurize liquid in a pressure space.

10 Claims, 3 Drawing Figures

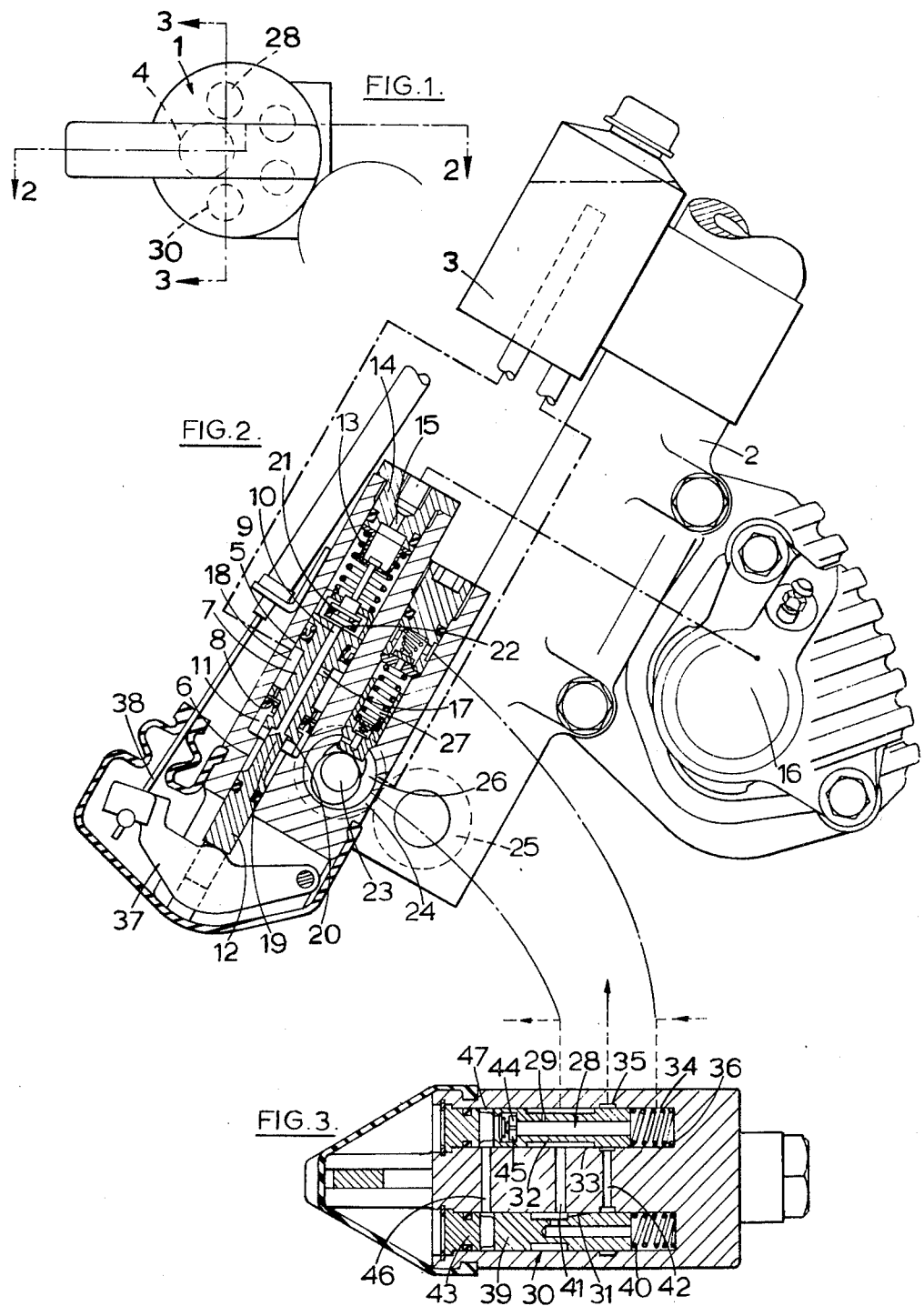

ANTI-SKID HYDRAULIC BRAKING SYSTEMS FOR VEHICLES

This invention relates to improvements in anti-skid hydraulic braking systems for vehicles, particularly although not exclusively motor cycles, the systems being of the kind in which a master cylinder is adapted to supply fluid under pressure to at least one slave cylinder to apply a brake, and anti-skid means are incorporated at least to reduce the pressure applied to the slave cylinder when the deceleration of a wheel braked by the breake exceeds a predetermined value, the anti-skid means comprising a pump having a liquid throughput adapted to increase with rotational speed of the wheel and arranged to withdraw liquid from a reservoir and return it thereto after circulation through a circuit, operation of the master cylinder adding a restriction into the circuit arranged so that the pressure of liquid in the circuit on the upstream pump side of the restriction is increased to generate a boost pressure which augments the pressure applied to the slave cylinder, a leakage path by-passing the restriction, the leakage path incorporating means providing a resistance to liquid flow which decreases automatically with increased wheel rotation speed, sensing means for sensing the deceleration of the wheel, and pressure reducing means operable by the sensing means when the deceleration of the wheel exceeds a predetermined value to reduce the boost pressure whereby the pressure applied to the slave cylinder is reduced.

One example of the anti-skid hydraulic braking system of the kind set forth is the subject of U.S. Pat. No. 3 743 363.

In the construction described in U.S. Pat. Specification No. 3 743 363 the master cylinder pressure is supplied to the slave cylinder through separate operating means including a piston working in a bore defining a chamber through which the master cylinder pressure is supplied to the slave cylinder, and the piston is exposed to pump pressure being advanced in the bore to reduce the effective volume of the chamber and generate the booster pressure when the brake is operated normally but being restracted to increase the effective volume of the chamber and so decrease the booster pressure when the deceleration of the braked wheel exceeds the said predetermined value, and the restriction is separate from the master cylinder and the operating means and comprises a valve located in the circuit on the downstream side of the operating means and operable to restrict return to the reservoir in response to pressure from the master cylinder.

According to our invention in an anti-skid hydraulic braking system of the kind set forth for vehicles the master cylinder comprises an operating piston and a boost piston both working in a common bore in a housing, a booster chamber defined in the bore between the adjacent ends of the pistons and connected to the pump, a pressure space defined in the bore at the end of the boost piston remote from the operating piston, a reservoir return port in the housing located between the boost chamber and pressure space and connected to the reservoir, an outlet port in the housing in communication with the pressure space and connected to the slave cylinder, passage means interconnecting the boost chamber, the return port and the outlet port, a boost control valve between the pistons which is movable between a normally open inoperative position in which the boost chamber is in communication with both the return and outlet ports and an operative closed position when the master cylinder is operated in which the boost chamber is isolated from the return and outlet ports so that pressure in the boost chamber is increased to advance the boost piston in the bore to pressurise liquid in the pressure space, and a recuperation valve controlling communication between the passage means and the pressure space, the recuperation valve being open when the control valve is open so that the slave cylinder is in communication with the reservior through the recuperation port, and the recuperation valve being closed to isolate the pressure space from the reservoir when the boost piston is advanced in the bore, additional movement of the boost piston in the same direction pressurising the liquid in the pressure space.

Thus closure of the first valve adds the restriction into the circuit to pressurise the boost chamber and augment the force applied to the operating piston.

Conveniently the first valve comprises a head on one of the pistons for engagement with a seating on the other piston so that, when the first valve is closed, a direct mechanical thrust is applied to the boost piston from the operating piston.

Preferably the bore is of stepped outline with the boost piston working in the bore portion which is of greater diameter, and the operating piston working in the bore portion of smaller diameter. Thus, pump pressure acts over a greater area to augment the brake applying force and reacts over a smaller area.

The boost piston preferably comprises axially spaced seals working in the bore at opposite ends of a piston portion of reduced diameter and the reservoir return port communicates at all times with the space between the seals, the passage means preferably comprises an open-ended longitudinally extending bore in the boost piston providing communication between the boost chamber and the pressure space and communicating with a radial port in the piston located between the seal, and the recuperation valve preferably comprises a head for engagement with a seating surrounding the end of the longitudinal bore which communicates with the pressure space.

One embodiment of our invention will now be described by way of example with reference to the accompanying drawings in which:

FIG. 1 is an inverted plan view of an anti-skid hydraulic braking system mounted on the frame of a motor cycle;

FIG. 2 is a section on the line 2—2 of FIG. 1; and

FIG. 3 is a section on the line 3—3 of FIG. 1.

In the anti-skid hydraulic braking system illustrated in the drawings a housing 1 is mounted on a part 2 of the frame of a motor cycle, for example the forks or a torque plate, and a reservoir 3 for hydraulic liquid is mounted on the part 2 above the housing 1.

The housing 1 is provided with a longitudinally extending stepped through bore 4 having a bore portion 5 of greater diameter and a bore portion 6 of smaller diameter. A boost piston 7 having spaced seals 8 and 9 at opposite ends of a portion of reduced diameter which works in the bore portion 5 is provided with an open ended longitudinal bore 10. The bore 10 provides communication between a boost chamber 11 defined in the bore 4 between the boost piston 7 and an input operating piston 12 which works in the bore portion 6 of smaller diameter and projects from the lower end of the housing 1, and a pressure space 13 defined in the bore 4 between the opposite end of the boost piston 7 and a plug 14 closing that end of the bore 4 and providing an outlet port 15 for connection to the hydraulic slave cylinder 16 of a wheel brake. The piston 7 has a radial port 17 located between the seals 8 and 9 providing communciation at all times with a return port 18 in the housing 1 connected to the reservoir 3.

Communication between the boost chamber 11 and the outlet port 15 and the return 18 is controlled by a first valve comprising a head 19 at the inner end of the operating piston 12 for engagement with a seating 20 surrounding the adjacent end of the longitudinal bore 10. In a normal inoperative position the first valve is open.

Communication between the bore 10 and the pressure space 13 is controlled by a recuperation valve of known type comprising a head 21 for engagement with a seating 22 surrounding the adjacent end of the bore 10 and which is normally held in an open position spaced from the seating.

An hydraulic pump 23 driven by gears 24 and 25 from the wheel of the cycle adapted to be braked by the slave cylinder 16 draws liquid from the reservoir 3 and pumps it in a circuit of the boost chamber 11 from whence it is returned by the reservoir 3. This liquid is pumped to the boost chamber 11 through a pump chamber 26, a longitudinal passage 27, pressure reducing means 28 and an orifice 29 incorporated in the reducing means. A leakage path by-passes the pressure reducing means 28 and incorporates a control valve 30 with a variable restriction 31.

The pressure reducing means 28 comprises a hollow spool 32 working in a longitudinal bore 33 in the housing 1 to control communication between a connection 34 connected to the passage 27 and a return connection 35 to the reservoir. Normally the spool 32 is held by a spring 36 in a position in which the return connection 35 is closed. Thus, with the pump operating when the brake is applied either by hand or by a foot pedal through a lever 37 operated by a cable 38, initial movement of the operating piston 12 closes the first valve to allow pressure to build up in the boost chamber 11 and advance the boost piston 7 in the bore, initially to close the recuperation port 21 and thereafter to pressurise the liquid in the pressure space 13 to apply the brake. The applying force is opposed by a reaction comprising the pressure in the boost chamber 11 acting over the inner end of the piston 12.

With high rotational speeds, a relative high differential pressure is generated by the pump 23 across the restrictor 29 and this forces to the right a shuttle 39 which incorporates the variable restrictor 31, due to the provision of a passage 41 so that liquid can be returned to the reservoir 3 by-passing the boost chamber through a further passage 42 communicating with the return connection 35 sensing means 40 acts on the shuttle 39 such that the rate of movement of the shuttle is in direct proportion to the rate of acceleration or deceleration of the wheel driving the pump 23. The sensing means comprises a helical spring with appropriate load deflection characteristics.

At low wheel rotational speeds, the shuttle 39 is urged by the spring 40 in the opposite direction against a stop 43 to close the passage 42 so only a lower differential pressure is generated across the restriction 29. During deceleration of the wheel driving the pump 23 and consequential movement of the shuttle 39 towards the stop 43 by the spring 40 an orifice 44 in a plate 45 spring urged into engagement with a seating at the end of the hollow spool 32 resists flow of liquid from the end of the shuttle 39 through a passage 46 in a reverse direction. Thus, there is a rise in pressure in a chamber 47, when the pressure differences between that in the chamber 47 and that in the hollow spool 32, which is substantially the output pressure of the pump 23, rises above a predetermined value and is sufficient to move the spool 32 to the right against the force in the spring 36, the connection 34 is placed in communication with the return connection 35 so that the pressure in the boost chamber 11 is relieved. Thus the augmenting boost pressure is reduced and consequently the brake on the wheel is partially reduced. This permits the wheel to start rotating at a higher rate again, and the output from the pump 23 will rise once more so that the pressure difference between the chamber 47 and that in the hollow spool 32 will fall, thus closing the return connection 35 to the reservoir 3.

It will be appreciated that if the road wheel driving the pump 23 is decelerated at a rate greater than a predetermined value, for example if the wheel skids or locks whilst being braked, the pressure reducing means 28 will operate to relieve the pressure acting on the spool 32 by moving the spool 32 to the right so that the brakes are partially released automatically, whereafter the wheel may commence to rotate again.

In the event of failure of the pump 23, the brakes can still be applied by the direct engagement of the operating piston 12 with the boost piston 7 to pressurise the liquid in the pressure space 13.

I claim:

1. An anti-skid hydraulic braking system comprising a brake applying means, a master cylinder, means connecting said brake applying means to said master cylinder, a reservoir for liquid, a pump having drive means which increases the pump throughput with increased wheel rotational speed, means connecting the pump input to said reservoir, at least on slave cylinder of a wheel brake, means connecting said master cylinder to said slave cylinder for supplying liquid under pressure to said slave cylinder to apply the brake, means connecting the pump output to said master cylinder through a restriction whereby the pressure of liquid in the circuit on the upstream pump side of said restriction is increased to generate a boost pressure which augments the pressure applied to said slave cylinder, a leakage path by-passing the restriction, said leakage path comprising means providing a resistance to liquid flow which decreases automatically with increased wheel rotation speed, sensing means for sensing the deceleration of the wheel, and pressure reducing means operable by said sensing means when the deceleration of the wheel exceeds a predetermined value to reduce said boost pressure whereby the pressure applied to said slave cylinder is reduced, said master cylinder comprising a housing having a bore, an operating piston and a boost piston both working in a said bore, a boost chamber defined in a part of said bore between adjacent ends of said pistons, means connecting said boost chamber to said pumps a pressure space defined in said bore at an end of said boost piston remote from said operating piston, a reservoir return port in said housing located between said boost chamber and said pressure space, means connecting said reservoir return port to said reservoir, an outlet port in said housing in communication with said pressure space, means connecting said outlet port to said slave cylinder, passate means interconnecting said boost chamber, said return port and said outlet port, a boost control valve
between said pistons movable between a normally open inoperative position in which said boost chamber is in communication with said return and outlet ports and an operative closed position when said master cylinder is operated in which said boost chamber is isolated from said return and outlet ports so that pressure is said boost chamber is increased to advance said boost piston in said bore to pressurise liquid in said pressure space, and a recuperation valve controlling comminication between said passage means and said pressure space, said recuperation valve being open when said control valve is open so that said slave cylinder is in communication with said reservoir through said recuperation port, and said recuperation valve being closed to isolate said pressure space from said reservoir when said boost piston is advanced in said bore, additional movement of said boost piston in the same direction pressurising the liquid in said pressure space.

2. A braking system as claimed in claim 1, wherein said boost control valve comprises a head provided on the operating piston which engages a seating provided on the boost piston.

3. A braking system as claimed in claim 2 wherein said bore is of stepped outline.

4. A braking system as claimed in claim 3 wherein said boost piston works in a bore portion of greater diameter and said operating piston works in a bore portion of smaller diameter.

5. A braking system as claimed in claim 1 wherein said boost piston comprises axially spaced seals working in said bore at opposite ends of a piston portion of reduced diameter.

6. A braking system as claimed in claim 5 wherin said passage means comprises a longitudinal bore with open ends in said boost piston.

7. A braking system as claimed in claim 6 wherein seatings are provided surrounding said open ends of said longitudinal bore.

8. A braking system as claimed in claim 7 wherein said recuperaton valve comprises a head for engagement with one of said seatings surrounding an open end of said longitudinal bore communicating with said pressure space.

9. A braking system as claimed in claim 6 wherein a radial port is provided in said boost piston between said seals to provide communication between said reservoir return port and said longitudinal bore.

10. A braking system as claimed in claim 7 wherein said master cylinder is formed integrally with said antiskid means.

* * * * *